United States Patent [19]

Grosso

[11] Patent Number: 4,951,698
[45] Date of Patent: Aug. 28, 1990

[54] PROCESS AND DEVICES FOR MAINTAINING THE GAS CONTAINED IN A SUBMERGED ENCLOSURE IN PRESSURE EQUILIBRIUM WITH THE OUTSIDE

[76] Inventor: Gilles A. Grosso, 58 Boucle de la Malogineste, 83140 Six Fours les Plages, France

[21] Appl. No.: 378,638

[22] Filed: Jul. 12, 1989

[30] Foreign Application Priority Data

Jul. 15, 1988 [FR] France .................. 88 09775

[51] Int. Cl.⁵ ............. F16K 17/36; H04R 17/00
[52] U.S. Cl. ..................... 137/81.2; 137/14; 367/167; 367/172
[58] Field of Search ........ 137/81.2, 236.1, 14; 367/167, 172

[56] References Cited

U.S. PATENT DOCUMENTS

| | | | |
|---|---|---|---|
| 3,868,623 | 2/1975 | Abbott | 367/172 |
| 4,074,224 | 2/1978 | Laurent | 367/167 |
| 4,151,437 | 4/1979 | Tocquet | 367/167 |
| 4,527,582 | 7/1985 | Buckle et al. | 137/81.2 |
| 4,763,307 | 8/1988 | Massa | 367/172 X |

FOREIGN PATENT DOCUMENTS

| | | |
|---|---|---|
| 2089007 | 1/1972 | France . |
| 2525516 | 10/1983 | France . |
| 2612876 | 9/1988 | France . |
| 7901136 | 12/1979 | World Int. Prop. O. . |

*Primary Examiner*—John Rivell
*Attorney, Agent, or Firm*—Bucknam and Archer

[57] ABSTRACT

This invention relates to a device for maintaining the gas contained in a submerged enclosure in pressure equilibrium with the outside, comprising a plurality of deformable bags which are immersed at the same time as said enclosure which are filled with gas compressed to different pressures and which communicate with said enclosure via a manifold on which they are connected by automatic three-way valves.

10 Claims, 8 Drawing Sheets

PROCESS AND DEVICES FOR MAINTAINING THE GAS CONTAINED IN A SUBMERGED ENCLOSURE IN PRESSURE EQUILIBRIUM WITH THE OUTSIDE

FIELD OF THE INVENTION

The present invention relates to a process and devices for maintaining the interior of a submerged gas-filled enclosure in pressure equilibrium with the exterior.

The technical sector of the invention is that of the construction of submerged apparatus, particularly electro-acoustic transducers.

BACKGROUND OF THE INVENTION

Enclosures submerged at great depth must withstand considerable hydrostatic pressures, which causes mechanical structural stresses of said enclosures.

In certain cases, the interior of the enclosure may be in communication with the exterior, with the result that there is always a pressure equilibrium and the walls of the enclosure do not have to withstand any pressure. However, in numerous cases, it is not possible to allow the water to penetrate in the submerged enclosure, inside which are located electrical or electronic apparatus or circuits which cannot be placed in contact with water or with an intermediate liquid.

In such cases, the interior of the enclosure is placed in communication with a deformable bag which is filled with gas and which is submerged at the same time as the enclosure, with the result that the gas located in the enclosure is constantly maintained at hydrostatic pressure.

In the following specification, reference will be made to embodiments concerning piezo-electric transducers which compose for example a sonar antenna which must be submerged to very great depths, of the order of several hundreds or thousands of meters. It is specified that this choice is not limiting and that the present invention may be applied to other submerged enclosures.

At the present time, the submerged transducers comprise a stack of piezo-electric elements, placed inside a water-tight housing which is connected by a pipe to a bag or bladder of deformable elastomer which is placed in an enclosure for mechanical protection which communicates with the ambient medium. If the bladder is filled with air at atmospheric pressure and if the volume of the housing of the transducer is relatively large, such a system can compensate the hydrostatic pressure only for a limited depth of immersion. In fact, let Vo be the initial volume of the bladder, $V_1$ the volume of air in the housing, Po the initial pressure and P the hydrostatic pressure when all the air contained in the bladder has passed in the housing, the following may be written:

$$P_o(V_o+V_1)=P_1V_1,$$

hence:

$$\frac{P_1}{P_o} = 1 + \frac{V_o}{V_1}$$

In order to attain a depth of immersion of 500 m which corresponds to a hydrostatic pressure of 50 bars, a bladder must therefore be used whose volume is equal to 49 times that of the assembly of the transducer housings if the initial pressure Po=1 bar. Such a bladder volume is generally not compatible with the dimensions admitted.

In order to reduce the volume of air, compensation systems have been used, composed of deformable bladders or bags which are pre-inflated under a pressure Po equal to several times atmospheric pressure. If, for example, Po=5 bars and if Vo/V$_1$=19, the hydrostatic pressure limits $P_1$=Po×20, or $P_1$=100 bars, i.e. a maximum depth of immersion of 1000 meters may be attained.

This solution means that, from the beginning of immersion, the housing of the transducer is subjected to an internal pressure and must be able to withstand it.

The housings having a considerable volume cannot withstand a high internal pressure, this limiting the depths of immersion which may be attained by a system of pressure compensation comprising preinflated bladders.

Another solution consists in connecting the housing of the transducer to a compressed air canister provided with a pressure reducing valve, like those used for diving.

In that case, during descent of the transducer and of the canister, the pressure reducing valve delivers air at a pressure which corresponds substantially to hydrostatic pressure. Even if the volume of the canister is small with respect to the volume of the housing, a considerable depth of immersion may be attained if the canister contains highly compressed gas. For example, if the initial pressure in the canister is 50 bars and if the ratio Vo/V$_1$=1/10, a hydrostatic pressure of 55 bars may be attained, viz. a depth of 550 meters. On rising to the surface, an excess pressure is created inside the housing and a valve or the pressure reducing valve allows the excess air to escape.

This solution therefore brings about the formation of air bubbles when rising to the surface, which is contra-indicated in the case of submerged sonar antennas used for military purposes.

Moreover, in the case of poor functioning of the pressure reducing valve, there is a risk of creating in the housing an excess pressure which it cannot withstand, hence a risk of destruction of the housing and of the equipment that it contains.

Moreover, in the case of the transducers forming part of a submerged machine which is towed by a ship, the depth of immersion continually varies, this causing an escape of air bubbles each time the transducer rises, which leads to a more rapid air consumption than the consumption expected and possibly bringing about a difference in pressure between the exterior and interior of the housing greater than the mechanical strength thereof.

It is an object of the present invention to provide means for establishing the equilibrium of the gas pressure inside a submerged enclosure with the hydrostatic pressure by means of gas-filled deformable bladders or bags which are submerged at the same time as the enclosure and which enable considerable depths of immersion to be attained without having to use large-volume bags nor to pre-inflate the enclosures on the surface.

A process according to the invention is of the type in which an enclosure and a gas-filled deformable bag which communicates with said enclosure are submerged simultaneously.

SUMMARY OF THE INVENTION

The object of the invention is attained by a process wherein a plurality of deformable bags which are filled with a gas compressed at different pressures from one bag to the other, are submerged simultaneously, at the same time as an enclosure, and, during descent, communication is automatically established between said enclosure and each of the small bags when the hydrostatic pressure attains substantially the pressure of the compressed gas contained in said bag and, during rise to the surface, each of the bags is automatically isolated when the pressure therein attains the initial pressure again.

The devices according to the invention are of the known type comprising an enclosure which is submerged simultaneously with a gas-filled deformable bag which communicates with said enclosure.

A device according to the invention comprises a plurality of deformable bags filled with gas compressed at different pressures, which bags are connected in parallel to a manifold which is connected to said enclosure and each of the bags other than the bag which contains the least compressed gas, is connected to said manifold by a three-way valve which is automatically controlled by means which open communication between said bag and said manifold when the hydrostatic pressure is substantially equal to the pressure in said bag.

According to a preferred embodiment, each deformable bag is placed inside a metal enclosure, in the form of a bottle, which comprises a first cylindrical shell closed by a cover and a second cylindrical shell closed by a convex bottom, which shells are assembled together by two flanges between which the opening of said bag is hermetically clamped and said convex bottom comprises openings which communicate the hydrostatic pressure to outside said bag whilst said cover comprises openings which place the interior of said bag in communication with said manifold or with one of said three-way valves.

The invention results in the possibility of immerging enclosures to great depth, maintaining them filled with a gas at equal pressure with the hydrostatic pressure without having to use cumbersome deformable bags.

The devices according to the invention employ bags pre-inflated on the surfaces which make it possible to attain considerable depths of immersion without ever exerting excess pressure within the enclosures which, very often, are not constructed to withstand an excess pressure, particularly in the case of electro-acoustic transducers.

The total dimensions of a device according to the invention are smaller than those of known devices enabling the same depth of immersion to be attained.

The devices according to the invention easily adapt to the variations of depth of immersion, for example in the case of a sonar antenna which is towed and of which the depth of immersion varies during towing.

The devices according to the invention make it possible to multiply the number of stages, i.e. the number of bags inflated to different initial pressures in order to have access to great depths.

Let us examine the case, for example, of an electro-acoustic transducer not able to withstand any internal excess pressure, having a minimum residual volume of 4 liters which must withstand a prolonged immersion at a depth of 250 m, which depth may vary.

It is not possible to use pre-inflated deformable bladders since the transducer cannot withstand any excess pressure.

It is not possible to use bottles provided with a pressure reducing valve which have a limited autonomy and which do not make it possible to know at which moment the reserve of air has become insufficient.

Bags filled with air at atmospheric pressure may be used, but in that case an initial volume of air of 400 liters must be available in order to be able to attain an immersion of 250 m.

If a device according to the invention comprising two stages each of 72 liters inflated to respective pressures of 1 bar and 3 bars is used, an initial volume of 144 liters suffices.

If a device according to the invention comprising three stages each of 37 liters inflated respectively to 1 bar, 2.3 bars and 7.6 bars is used, an initial volume of 111 liters suffices.

With 4 stages each of 25 liters, an initial volume of 100 liters is attained. It is therefore seen that a device according to the invention makes it possible substantially to reduce the initial volume of gas necessary for maintaining an enclosure at equal pressure without ever placing the interior thereof under excess pressure.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
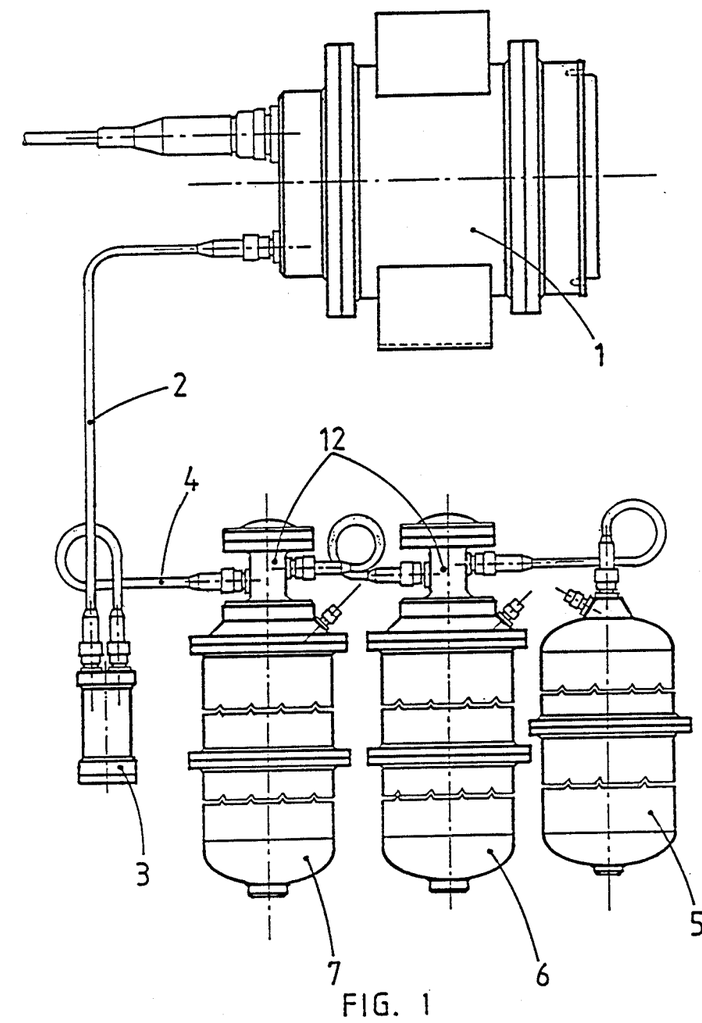
FIG. 1 is an overall view of a device according to the invention.

Referring now to the drawings, FIG. 1 shows an electro-acoustic transducer of any known type comprising a water-tight housing containing piezo-electric plates inserted between electrodes. The housing of the transducer is filled with gas.

The housing of the transducer is connected to a pipe 2 which is for example a supple pipe capable of withstanding the hydrostatic pressure or an external pressure. The pipe 2 is connected to an air dehumidifier 3 which contains a product such as for example silica gel which absorbs the humidity of the air.

The dehumidifier 3 is connected, by a pipe 4, to an assembly of three deformable bladders 5, 6 and 7 which are filled with gas.

Figure 2:
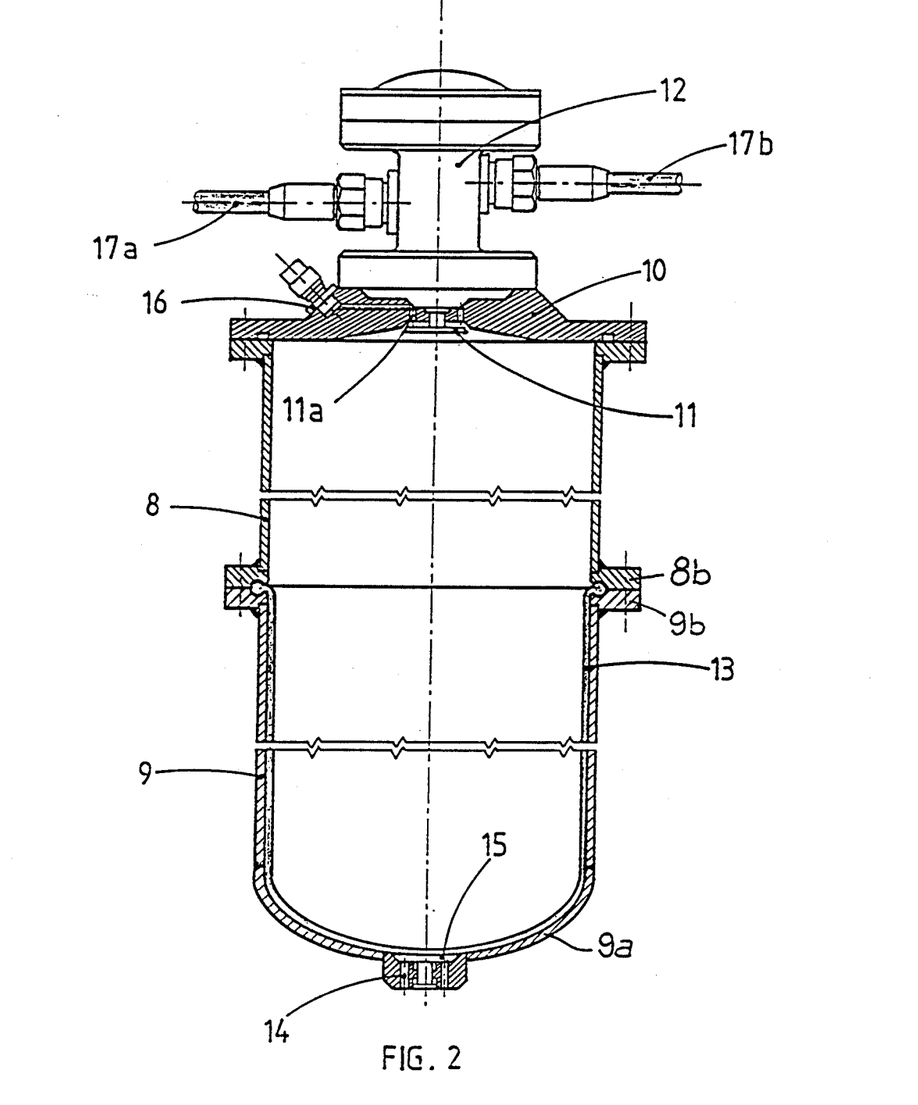
FIG. 2 is an axial section of a metal enclosure containing a deformable bag.

FIG. 2 is an axial section of one of the bags 6 and 7. It is seen that each bag comprises a metal enclosure which is composed of a cylindrical shell 8 of which one end is assembled by flanges to a second cylindrical shell 9 closed by a convex bottom 9a and of which the other end is closed by a cover 10 bearing a valve 11 which places the enclosure in communication with an automatic three-way valve 12 which will be described hereinafter.

The metal enclosure contains a bag or bladder 13 made of deformable elastomer of which the opening is hermetically clamped between the two flanges 8b and 9b which serve to assemble the shells 8 and 9. The convex bottom 9a comprises openings 14 which are obturated by a valve 15 when the bladder is inflated.

Reference 16 represents the endpiece for inflation.

FIG. 2 represents the bladder 13 in inflated position.

Figure 3:
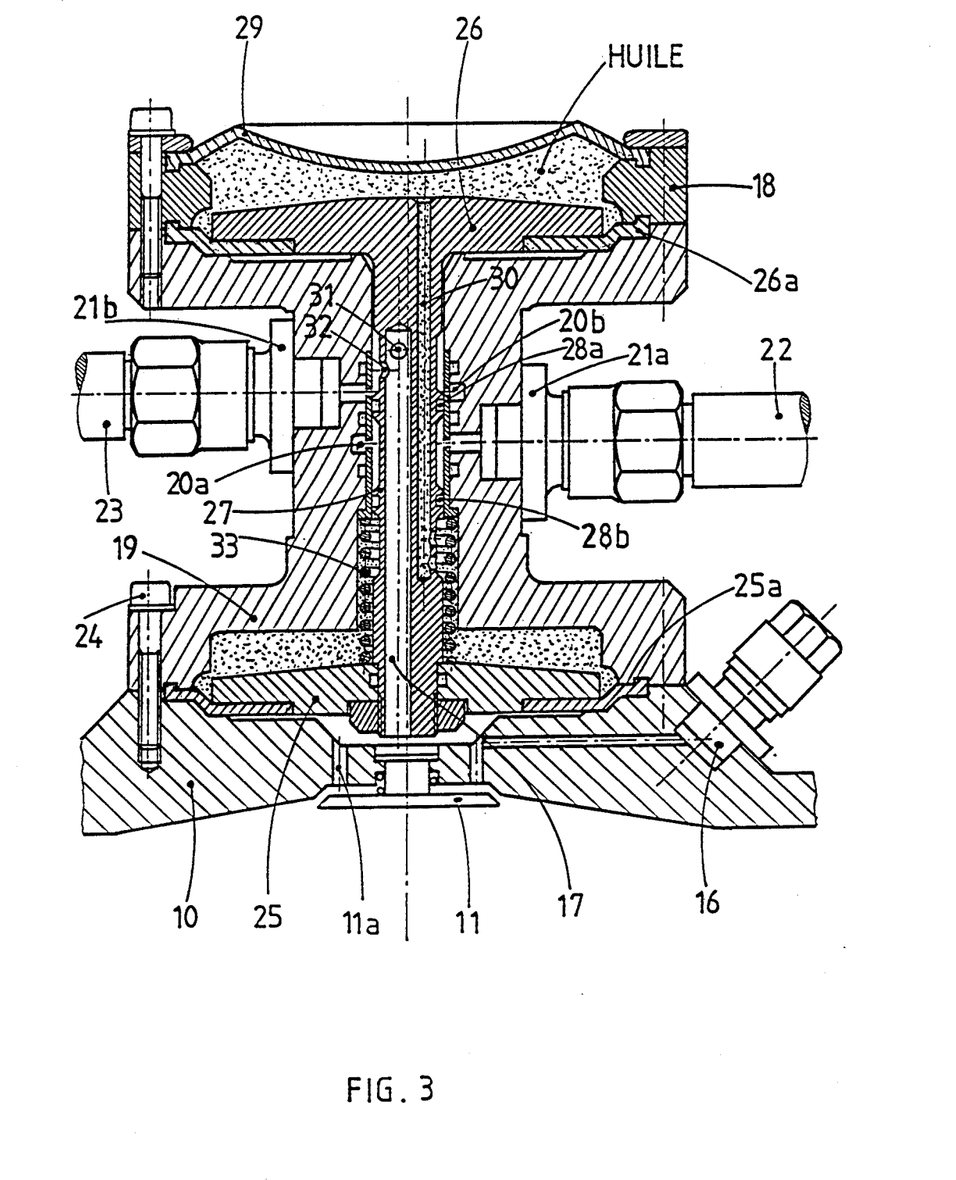
FIGS. 3 and 4 are axial sections of an automatic valve equipping enclosures according to FIG. 2.
Figure 4:
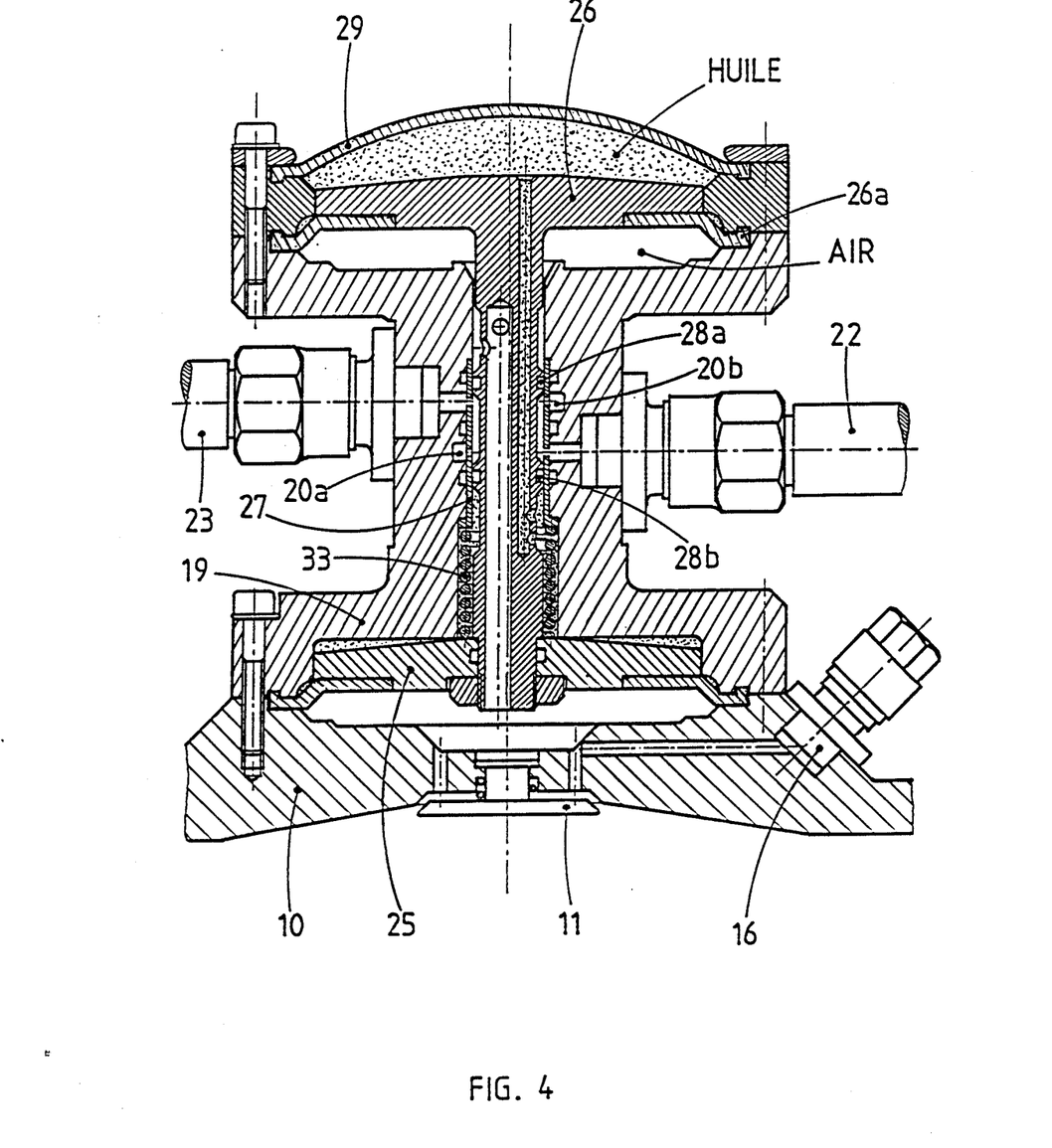

FIGS. 3 and 4 are axial sections of one of the automatic three-way valves 12 equipping each of the bladders 6 and 7.

FIGS. 3 and 4 represent two different functions of the same valve. It is seen in these Figures that each valve comprises an axial gas conduit 17 which communicates with the interior of the bladder on which the valve is mounted via conduits 11a adapted to be obturated by valve 11.

The valve body 19 comprises two grooves 20a, 20b which communicate with lateral conduits in each of which are screwed threaded endpieces 21a and 21b on which two pipes 22 and 23 are connected.

The valve body 19 comprises a base which is fixed by screws 24 on the cover 10 of one of the enclosures containing a bladder.

The valve body contains two pistons 25 and 26 which are respectively fast with the deformable membranes 25a and 26a made of vulcanized elastomer. The two pistons are connected together by an axial rod 27 in which passes the axial channel 17. The rod 27 bears two seals 28a and 28b of which the position varies with the displacements of the rod and determines the communication between the three ways. The space located between the membrane 25a and the lower seal 28b is filled with oil.

The upper part of the valve body is closed by a tight, deformable membrane 29 of which the outer face is placed in contact with the water. The space between the two membranes 29 and 26a is filled with oil and this space communicates, via a channel 30 made in the rod 27, with the oil-filled space located between the lower seal 28b and the membrane 25a.

The axial air conduit 17 comprises at its upper end two channels 31 and 32 which communicate with the space between the membrane 26a and the upper seal 28a. The valves according to FIGS. 3 and 4 are designed so that the mechanical parts are in contact with the sea water.

The hydrostatic pressure is exerted on the membrane 29 and the oil transmits this pressure to the two pistons 26 and 25.

The mobile assembly composed of two pistons connected by a rod increases the surface subjected to the hydrostatic pressure and improves reliability of operation.

The valve further comprises a return spring 33 which abuts on the valve body and repels the two pistons downwardly, i.e. towards the enclosure containing the inflated bladder.

Bag 5 is inflated to atmospheric pressure or to a slightly higher pressure and it is directly connected to the air pipe, without the interposition of a valve 12, as seen in FIG. 1. Bag 6 is inflated to an intermediate pressure, for example 8 bars, whilst bag 7 is inflated to a higher pressure, for example 20 bars which it can withstand thanks to the metal housing 9, 9a which can withstand such a pressure and which supports the deformable bag.

Operation is as follows:

Bags 6 and 7 are inflated by connecting an inflating means on the endpieces 16. The pressure in each bag repeals the pistons 25 and 26 of the valve 12 equipping this bag and places the valve in the position of FIG. 4 where the two grooves 20a, 20b lie between the two seals 28a, 28b, the two lateral ways of the valve communicate with each other and the gas contained in the bag cannot leave as the orifices 31, 32 do not communicate with the lateral outlets.

When the transducers and the bags 5, 6 and 7 connected thereto in accordance with FIG. 1 are immersed, the hydrostatic pressure is exerted on the membranes 29 of the two valves which transmits the pressure to the oil contained in each valve. The hydrostatic pressure is exerted on the deformable bag 5 which contracts and drives out the gas that it contained towards the housing of the transducer in order to maintain the latter under equal pressure with the water. The volume of the deformable bag 5 is calculated for the bag not to be completely compressed when the intermediate pressure of 8 bars is attained. When the deformable bag 5 reaches the cover 10, it abuts against the valve 11 and closes it.

When the pressure attains the intermediate pressure of 8 bars, the valve 12 equipping the intermediate bag 6 automatically changes position. In fact, at that moment, the two pistons 25 and 26 which equip this valve are subjected to the hydrostatic pressure on their upper face and to the pressure of the gas in the bag 6 on their lower face, i.e to two equal pressures.

The return spring 33 repels the two pistons downwardly and the valve automatically tips into the position shown in FIG. 3 where the communication with the upstream bag 5 is interrupted and where the bag 6 communicates with the transducers. It is seen that the valve 12 constitutes a pressostat which compares the hydrostatic pressure with the pressure in the deformable bag and which automatically manoeuvres the valve when the two pressures become equal.

Whilst the depth of immersion continues to increase, the gas contained in the intermediate bag 6 passes in the transducers and maintains them under equal pressure.

When the hydrostatic pressure attains the pressure in the third bag 7, i.e. 20 bars, the valve 12 equipping the bag 7 detects the equality of the pressures and automatically tips in the position shown in FIG. 3 where the third bag communicates with the transducers.

During rise to the surface, a sequence of operations opposite the preceding ones is automatically obtained.

As the hydrostatic pressure decreases, bag 7 expands and part of the gas contained in the transducers passes in the bag which is entirely filled when the hydrostatic pressure has descended to 20 bars. At that moment, the pressure in bag 7 becoming higher than the hydrostatic pressure, the gas pressure acting on the lower faces of the pistons 25 and 26 causes the valve 12 equipping bag 7 to tip. This valve again occupies the position shown in FIG. 4. The gas contained in the transducers passes progressively in bag 6 until the latter is entirely inflated, which takes place when the hydrostatic pressure has become equal to that of the intermediate bag.

The deformable bag 6 then being in abutment against the metal enclosure which contains it, it can no longer inflate. The pressure in the bag becomes greater than the hydrostatic pressure and the valve 12 equipping the intermediate bag 6 tips, placing the transducers in communication with the bag 5 until one has returned to the surface.

It is seen that the device described makes it possible to maintain a submerged enclosure at the hydrostatic pressure without any air bubble escaping in the water and without ever creating any excess pressure in the enclosure.

This result is attained by using a series of deformable bags having a relatively small volume.

Figure 5:
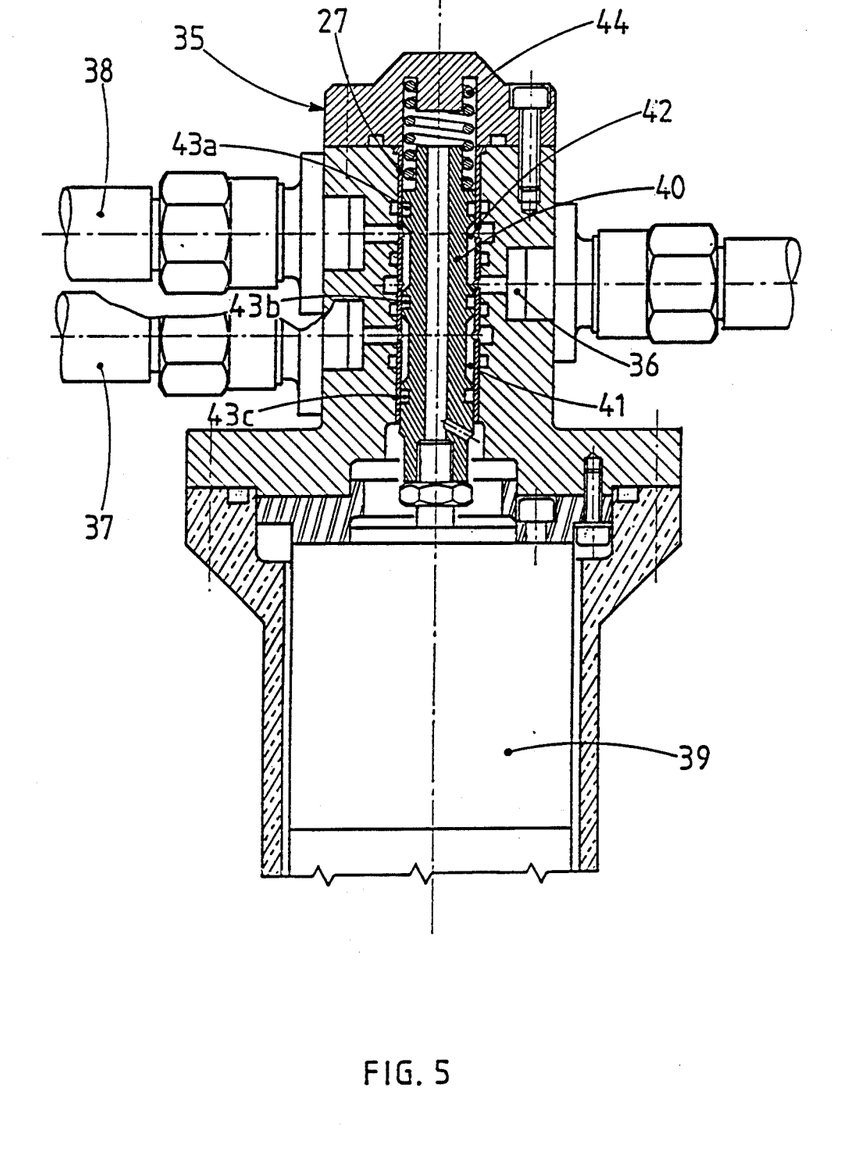
FIG. 5 is an axial section of an electro-valve intended to equip an enclosure according to FIG. 2.
Figure 6:
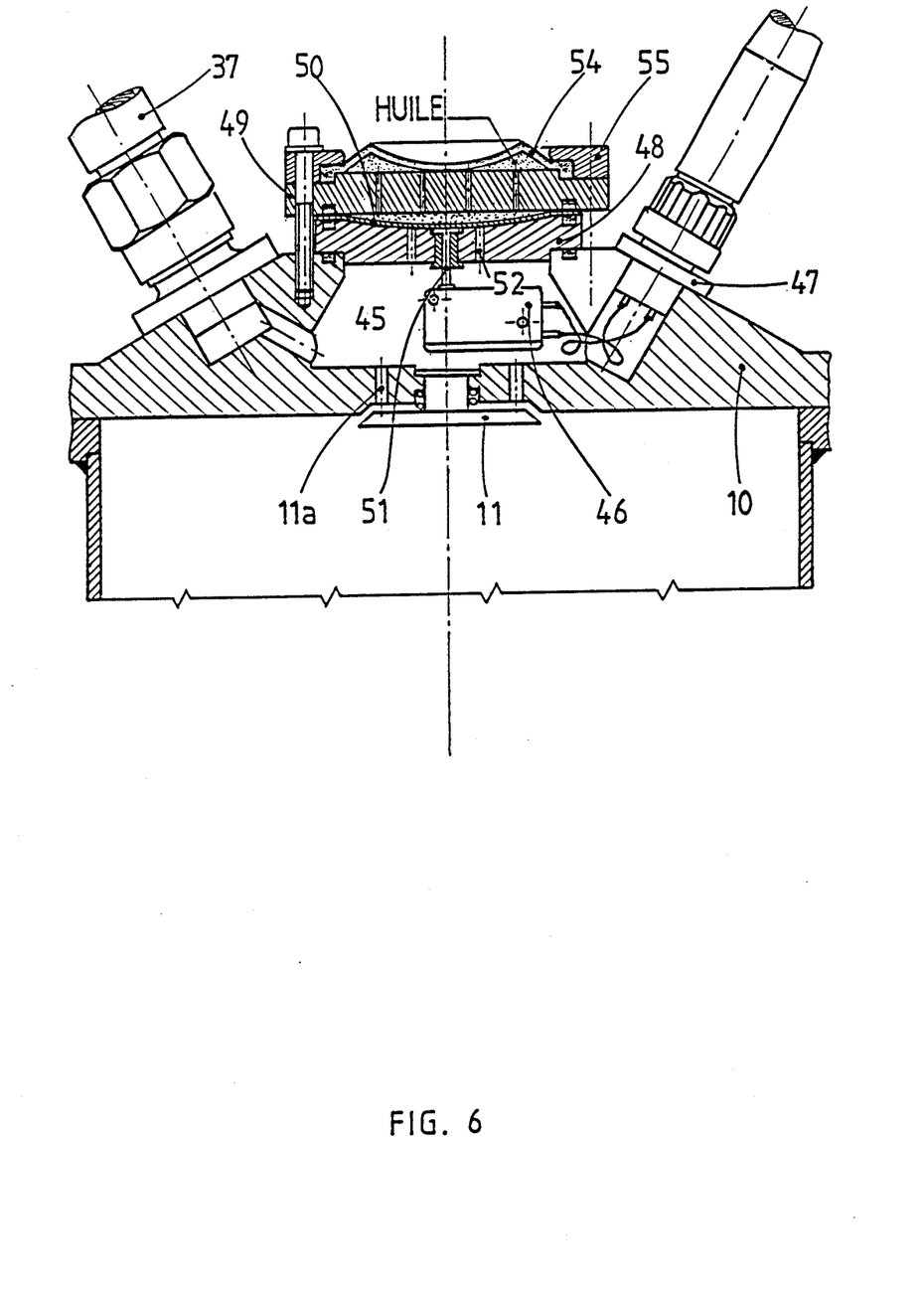
FIG. 6 is a section of a hydrostatically controlled switch intended to be associated with an electro-valve according to FIG. 5.

FIGS. 5 and 6 show a variant embodiment in which the automatic valves 12 controlled directly by the differences in pressure are replaced by electro-valves controlled by a hydrostatic switch.

FIG. 5 is an axial section of a three-way electro-valve 35 equipping one of the two enclosures containing the deformable bags 6 and 7.

One of the ways 36, for example the way located to the right of FIG. 5, is connected to the transducers in the case of the electro-valve equipping bag 7 or to bag 7 in the case of the electro-valve equipping bag 6. Another way 37 is connected to the bag which bears the electro-valve. The third way is connected to the bag located upstream, i.e. on bag 5 in the case of the electro-valve equipping bag 6 and on bag 6 in the case of the electro-valve equipping bag 7.

Each electro-valve comprises a coil 39 and a mobile core extended by a rod 40 which slides in an axial bore in which the three ways open out at different levels.

The mobile rod 40 bears three seals 43a, 43b, 43c and two grooves 41, 42 each located between two seals.

Rod 40 is repelled downwardly by a return spring 44.

FIG. 5 shows an electro-valve in a position where the coil of the electro-magnet is not energized. The spring 44 maintains the rod 40 downwardly. In that position, way 38 communicates with way 36, i.e. way 37 coming from the bag equipped with the electro-valve is isolated.

FIG. 6 is an axial section in which is found the cover 10 of an enclosure containing one of the bags 6 or 7 as well as the valve 11 and the conduits 11a for passage of gas.

The cover 10 comprises a closed cavity 45 in which open out the conduits 11a as well as the pipe 37 which is connected to one of the ways of the electro-valve. The cavity 45 contains a micro-switch 46 which is connected by electrical leads to the electro-magnet 39 which controls the electro-valve. The electrical leads emerge from the cover via a tight connector 47.

The cavity 45 is closed by a cover which is composed of two metal parts 48 and 49 which define therebetween a space in which is located an elastic metal membrane 50 which bears at its center a rod 51 adapted to actuate the micro-switch.

The part 48 comprises channels 52 which place the cavity 45 in communication with the space located beneath the membrane 50 with the result that the gas pressure in the enclosure is exerted against the lower face of the membrane.

Part 49 also comprises channels which pass right through it. The device further comprises a deformable membrane 54 made of elastomer which is placed in contact with the water and which is maintained hermetically applied above part 49 by a flange 55. The space between the membrane 54 and the membrane 50 is filled with oil which is at the hydrostatic pressure. As long as the hydrostatic pressure is less than the pressure in the enclosure, the membrane 50 is stretched and the micro-switch 46 is open.

The electro-magnet 39 controlled by the micro-switch 46 is not energized and the electro-valve 35 is in the position shown in FIG. 5.

When the hydrostatic pressure becomes substantially equal to the pressure in the enclosure, the elastic membrane 50 bends and returns to the position of rest and the rod 51 closes the micro-switch.

The electro-magnet is energized and the electro-valve 35 places way 36 in communication with way 37 which is connected to the enclosure associated with the electro-valve.

Figure 7:
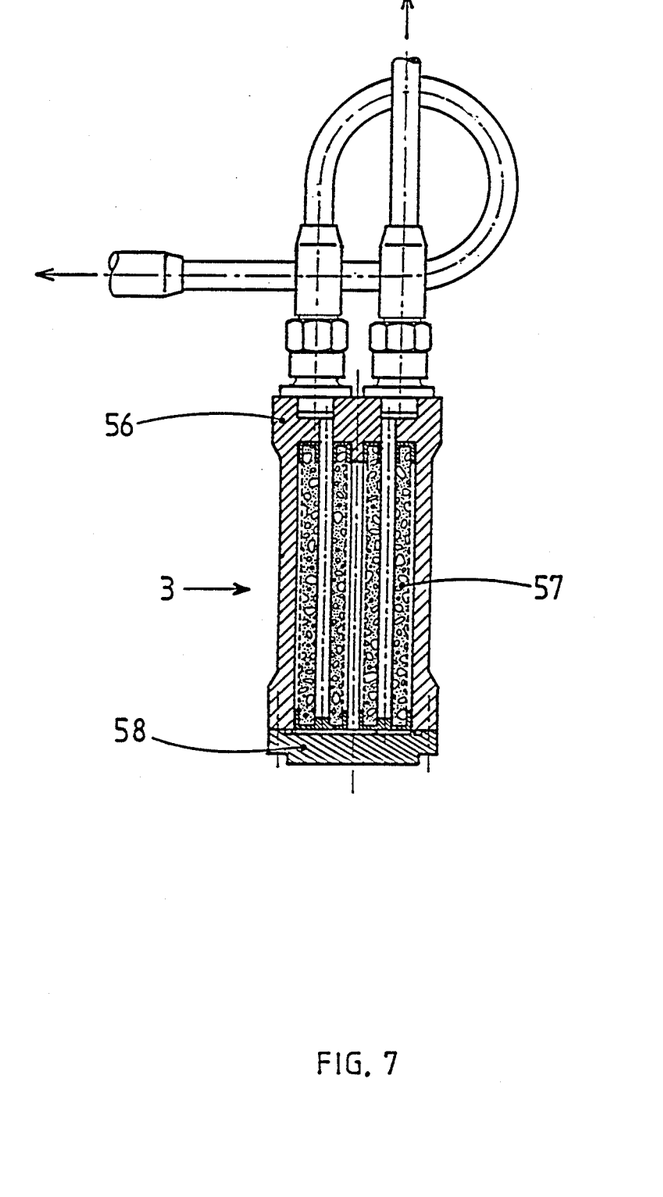
FIG. 7 is a section through an air dehumidifier.

FIG. 7 is a section of the air dehumidifier 3 shown in FIG. 1. The latter has for its function to absorb the humidity of the air to maintain the air dry despite a prolonged immersion. It comprises a transparent housing 56, for example a housing of methyl methacrylate and cartridges 57 of a product which absorbs air vapour, for example silica gel, which is placed in a lattice envelope which stops the product and allows the air to pass. The absorbent product contains a material which changes colour with the rate of humidity. The air traverses the two cartridges to pass from the central conduit of one to the central conduit of the other. The transparent body 56 is closed by a dismountable bottom 58 which makes it possible to change the cartridges to regenerate them by passage in an oven.

Figure 8:
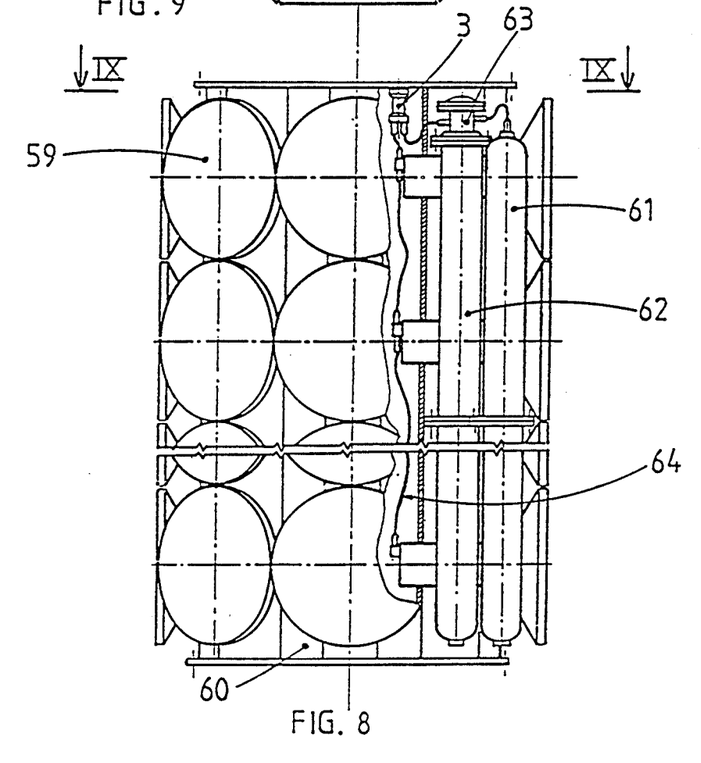
FIGS. 8 and 9 are respectively, a view in elevation and a section along IX—IX of a sonar antenna comprising a device according to the invention.
Figure 9:
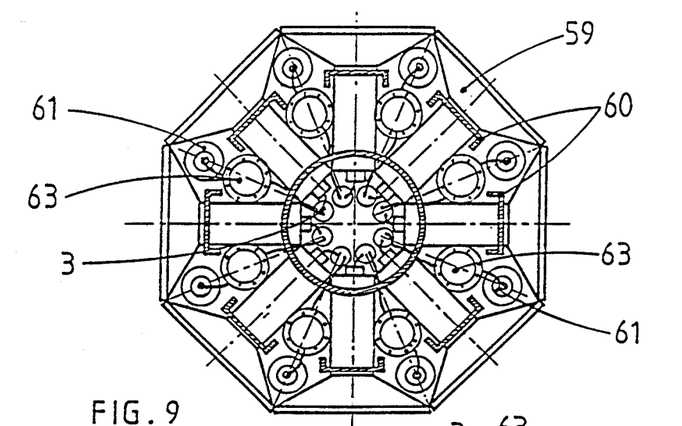

FIGS. 8 and 9 respectively show a view in elevation with parts torn away and a view along IX—IX of a sonar antenna of generally cylindrical shape, of polygonal cross-section, which comprises columns of transducers of Tonpilz type mounted on a bearing structure 60. In this example, a pair of enclosures 61, 62 is used for each transducer column. Enclosures 61, 62 each contain a deformable bag placed in contact with the water. Enclosures 61 are filled with gas at atmospheric pressure whilst enclosures 62 are filled with gas compressed at 5 bars for example. Enclosures 62 are equipped with a three-way valve 63 according to FIGS. 3 and 4. The outlet way of the valve 63 is connected to an air dehumidifier 3 which is itself connected to a manifold 64 on which the transducers of a column are connected in parallel. FIGS. 8 and 9 show that, thanks to their reduced volume, the enclosures 61, 62 may easily be housed within the bearing structure of the antenna without increasing the space requirement thereof.

I claim:

1. A process for maintaining a gas contained in a submerged enclosure in pressure equilibrium with the ambient hydrostatic pressure of the type in which said enclosure and a gas-filled deformable bag which communicates with said enclosure are immersed simultaneously, wherein a plurality of deformable bags are filled with a gas compressed at different pressures from one bag to the other, then said bags are submerged simultaneously, and, during descent, communication is automatically established between said enclosure and each of the said bags when the hydrostatic pressure attains substantially the pressure of said gas contained in said bag and, during rise to the surface, each of the bas is automatically isolated when the pressure therein attains initial pressure again.

2. A device for maintaining a gas contained in a submerged enclosure in pressure equilibrium with the ambient hydrostatic pressure, of the type comprising at least one gas-filled deformable bag which communicates with the interior of said enclosure and which is immersed at the same time as the latter, which comprises a plurality of deformable bags filled with a gas compressed at different pressure, said bags being connected in parallel to a manifold, said manifold being connected to said enclosure and each of said bags other than the bag which contains the least compressed gas, is connected to said manifold by a three-way valve, said manifold being automatically controlled by means which open communication between each of said bags, and said manifold when the hydrostatic pressure is substantially equal to the pressure in each of said bags, and which automatically close said communication when the hydrostatic pressure is slightly less than the pressure in each of said bags.

3. The device of claim 2, wherein each deformable bag is placed inside a metal enclosure, in the form of a bottle, which comprises a first cylindrical shell closed by a cover and a second cylindrical shell closed by a convex bottom, said first and second shells being assembled together by two flanges between which said bag is hermetically clamped and said convex bottom comprises openings which communicate the ambient hydrostatic pressure to the outside of said bag, said cover comprising openings which place the interior of said bag in communication with said manifold or with one of said three-way valves.

4. The device of claim 2, wherein each of the deformable bags other than the bag inflated with the least compressed gas is equipped with a three-way valve which comprises upper and lower pistons connected together by a rod, said upper and lower pistons being subjected on one of their two faces to the pressure of the gas in one of the bags and on the other face to the hydrostatic pressure and to the action of a spring, whereby when the hydrostatic pressure becomes substantially equal to the pressure of the gas in said bag, said spring displaces said upper and lower pistons, said bag is placed in communication with said manifold and at the same time isolates said manifold from the bags initially inflated at a lesser pressure.

5. The device according to claim 4, wherein each of said pistons is equipped with an elastomer membrane, said valve has a body, said membrane ensuring sealing between said piston and the valve body.

6. The device of claim 4, wherein said rod comprises a longitudinal channel which passes through said upper piston and which places in communication the space located above said upper piston with the space located between an inner piston and a seal borne by said rod, which spaces are filled with oil and said valve further comprises a deformable membrane made of elastomer, an outer face thereof being in contact with ambient water and an inner face thereof being in contact with said oil.

7. The device of claim 6, wherein said rod comprises a longitudinal channel which opens out below said lower piston, said channel having an upper end, said upper end comprising at least one hole which opens out outside said rod.

8. The device of claim 2, wherein said three-way valves are electro-valves having a coil, said coil being controlled by a hydrostatically controlled micro-switch.

9. The device of claim 8, wherein a cover of each metal enclosure containing the bags other than the bag containing the least compressed gas comprises a cavity in which is housed said micro-switch, said cavity communicating with the interior of said bag via channels, with one of the electro-valves via a pipe and is closed by a closure, said closure being composed of two metal pieces, said metal pieces defining therebetween a space in which an elastic metal membrane may move freely, said membrane bearing a central rod, said rod acting on a contact of said micro-switch and said metal membrane is subjected on one of its faces to the pressure of the gas in said bag and on its other face to the pressure of an oil which is maintained at the hydrostatic pressure by an elastomer membrane.

10. The device of claim 2, which further comprises an air dehumidifier which is placed in fluid communication with said manifold and which comprises a body made of a transparent material and cartridges made of a material which absorbs the humidity of the air, indicating humidity levels by changing color, which material is enclosed in an airpermeable lattice.

* * * * *